(12) United States Patent
Liu (10) Patent No.: US 11,054,238 B2
(45) Date of Patent: Jul. 6, 2021

(54) METHOD, SYSTEM, AND COMPUTER-READABLE MEDIUM FOR DETECTING WHEEL TREAD DEPTH

(71) Applicant: WISTRON CORP., New Taipei (TW)

(72) Inventor: Wei-Lun Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 359 days.

(21) Appl. No.: 15/238,521

(22) Filed: Aug. 16, 2016

(65) Prior Publication Data

US 2017/0254632 A1   Sep. 7, 2017

(30) Foreign Application Priority Data

Mar. 2, 2016   (TW) .................................. 105106335

(51) Int. Cl.
| | |
|---|---|
| *G01B 5/18* | (2006.01) |
| *G01B 21/12* | (2006.01) |
| *G01B 21/18* | (2006.01) |
| *B60C 23/04* | (2006.01) |
| *B60C 11/24* | (2006.01) |
| *G01M 17/02* | (2006.01) |

(52) U.S. Cl.
CPC .............. *G01B 5/18* (2013.01); *B60C 11/246* (2013.01); *B60C 23/04* (2013.01); *B60C 23/0488* (2013.01); *G01B 21/12* (2013.01); *G01B 21/18* (2013.01); *G01M 17/02* (2013.01)

(58) Field of Classification Search
CPC ........... G01B 5/18; G01B 21/12; G01B 21/18
See application file for complete search history.

(56) References Cited

U.S. PATENT DOCUMENTS 5,886,623 A * 3/1999 Jinbo ....................... B62J 99/00
                                                              340/432
7,460,950 B2   12/2008 Wurth
(Continued)

FOREIGN PATENT DOCUMENTS

| CN | 104781092 A | 7/2015 |
| EP | 2 711 693 A1 | 3/2014 |

(Continued)

OTHER PUBLICATIONS

TW Office Action dated Oct. 24, 2016 as received in Application No. 105106335 (English Translation).
(Continued)

*Primary Examiner* — Matthew G Marini
(74) *Attorney, Agent, or Firm* — Maschoff Brennan (57) ABSTRACT

A method, a system and a computer-readable medium for detecting a wheel tread depth include a first detector, a second detector and a processor. The first detector is configured to detect a moving distance of a vehicle moved by at least one wheel. The second detector is configured to detect a number of tunes of the wheel while the vehicle moves the moving distance. The processor is electrically connected to the first detector and the second detector. The processor is configured to compute a current diameter of the wheel according to the moving distance and the number of tunes of the wheel and determine a parameter of the tread pattern of the wheel according to the current diameter of the wheel and a reference value.

6 Claims, 6 Drawing Sheets

(56) References Cited

U.S. PATENT DOCUMENTS

| | | | | |
|---|---|---|---|---|
| 2006/0064240 A1* | 3/2006 | Wurth | ............... | B60C 23/061 |
| | | | | 701/32.4 |
| 2008/0228411 A1* | 9/2008 | Miyashita | ............ | B60C 11/246 |
| | | | | 702/34 |
| 2010/0295669 A1* | 11/2010 | Pannek | ............... | B60C 11/24 |
| | | | | 340/438 |
| 2015/0035971 A1 | 2/2015 | Bogenschuetz | | |
| 2015/0239298 A1* | 8/2015 | Kretschmann | ........ | B60C 11/246 |
| | | | | 701/33.7 |
| 2017/0023441 A1* | 1/2017 | Luk | ................... | G01M 17/02 |

FOREIGN PATENT DOCUMENTS

| | | | | |
|---|---|---|---|---|
| EP | 2777957 A2 * | 9/2014 | ......... | B60C 23/0476 |
| TW | M506723 U | 8/2015 | | |

OTHER PUBLICATIONS

"Minimum Energy Control of In-Wheel Motors with Real Time Road Adaption (III)" Tesheng Hsiao, 2011.
CN Office Action in application No. 201610190472.7 dated Oct. 31, 2018.

* cited by examiner

__METHOD, SYSTEM, AND COMPUTER-READABLE MEDIUM FOR DETECTING WHEEL TREAD DEPTH__

CROSS-REFERENCE TO RELATED APPLICATIONS

This non-provisional application claims priority under 35 U.S.C. § 119(a) on Patent Application No(s). 105106335 filed in Taiwan, R.O.C. on Mar. 2, 2016, the entire contents of which are hereby incorporated by reference.

TECHNICAL FIELD

The disclosure relates to a method, system and a non-transitory computer-readable medium for detecting wheel tread depth, more particularly to a method, system and a non-transitory computer-readable medium for determining the wheel tread depth using a vehicle's distance moved and a wheel's number of turns.

BACKGROUND

Wheels of common vehicles usually have a wheel rim and a tire, and the tread of the tire has a tread pattern to increase the traction and grip between the tire and the road surface for transportation safety, lower puncture rate or the reduction of other dangerous situations.

However, the tire comes in contact with the road surface and begins to wear down during usage, so the wheel tread depth of the tire will gradually get shallower. Therefore, after the tire has been used for a period of time, the wheel tread depth is usually used to determine whether the tire should be taken out of service. In the past, determining the wheel tread depth was usually done by estimating the wheel tread depth with the naked eye or by directly measuring it, but these conventional ways cannot accurately assure that the wheel tread depth is still sufficient, leading to the driver missing or not knowing the right time to replace the worn tire if neglecting to check the wheel tread depth.

SUMMARY

According to one or more embodiments, a method of detecting a wheel tread depth includes the following steps. Use a first detector to detect a moving distance that a vehicle is moved by at least one wheel. Use a second detector to detect the number of turns of a wheel of the vehicle in the moving distance. Calculate a current diameter of the wheel according to the moving distance and the number of turns. Determine a pattern parameter of the wheel according to the current diameter and a reference value.

According to one or more embodiments, a system of detecting a wheel tread depth includes a first detector, a second detector and a processor. The first detector is applicable to detect the moving distance that the vehicle is moved by at least one wheel. The second detector is applicable to detect the number of turns of a wheel of the vehicle in the moving distance. The processor is electrically connected to the first detector and the second detector and is applicable to calculate a current diameter of the wheel according to the moving distance and the number of turns and determine a pattern parameter of the wheel according to the current diameter and a reference value.

According to one or more embodiments, a non-transitory computer-readable medium is applicable to store executable instructions that when executed by a processor cause the processor to effectuate a method including the following steps. Drive a first detector to detect a moving distance that a vehicle is moved by at least one wheel. Drive a second detector to detect the number of turns of a wheel of the vehicle in the moving distance. Calculate a current diameter of the wheel according to the moving distance and the number of turns. Determine a pattern parameter of the wheel according to the current diameter and a reference value.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
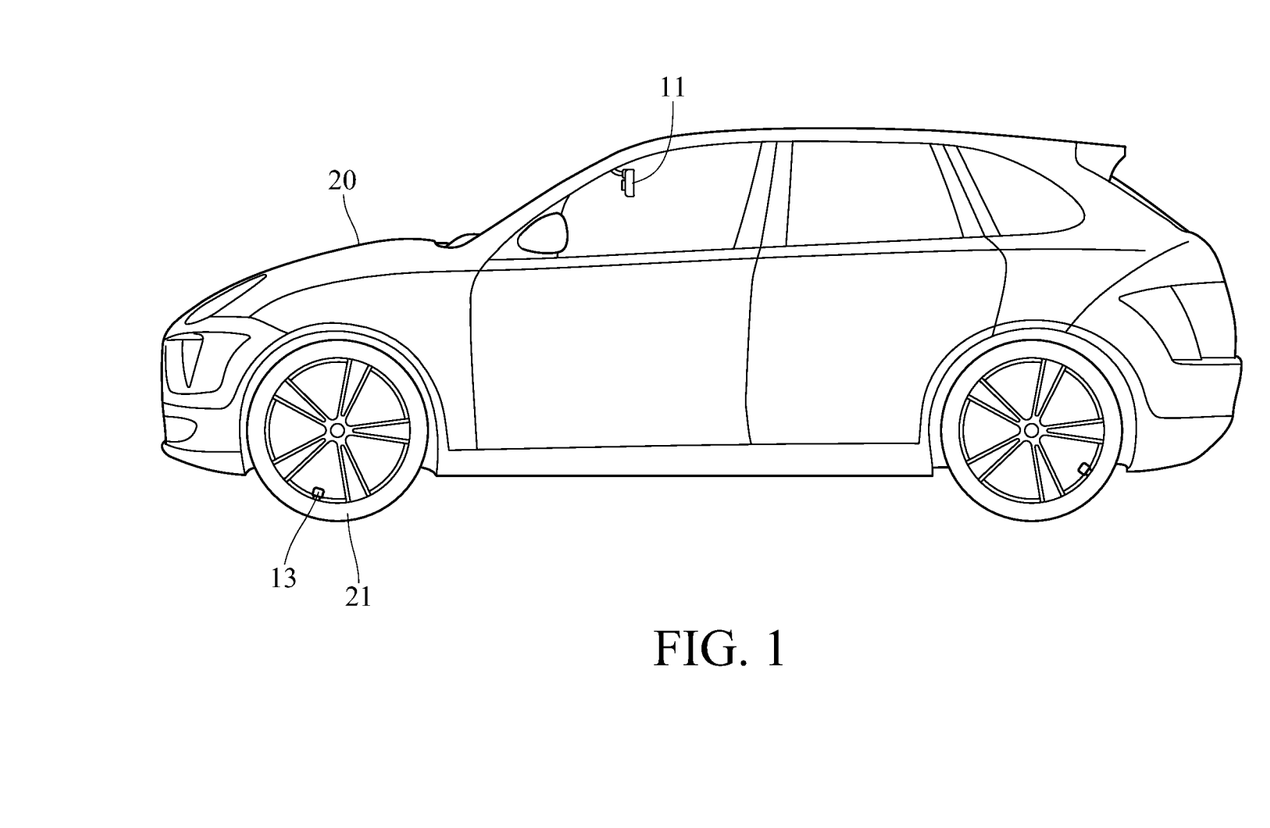
FIG. 1 is a schematic view of a vehicle with wheels in an embodiment of the disclosure.
Figure 2:
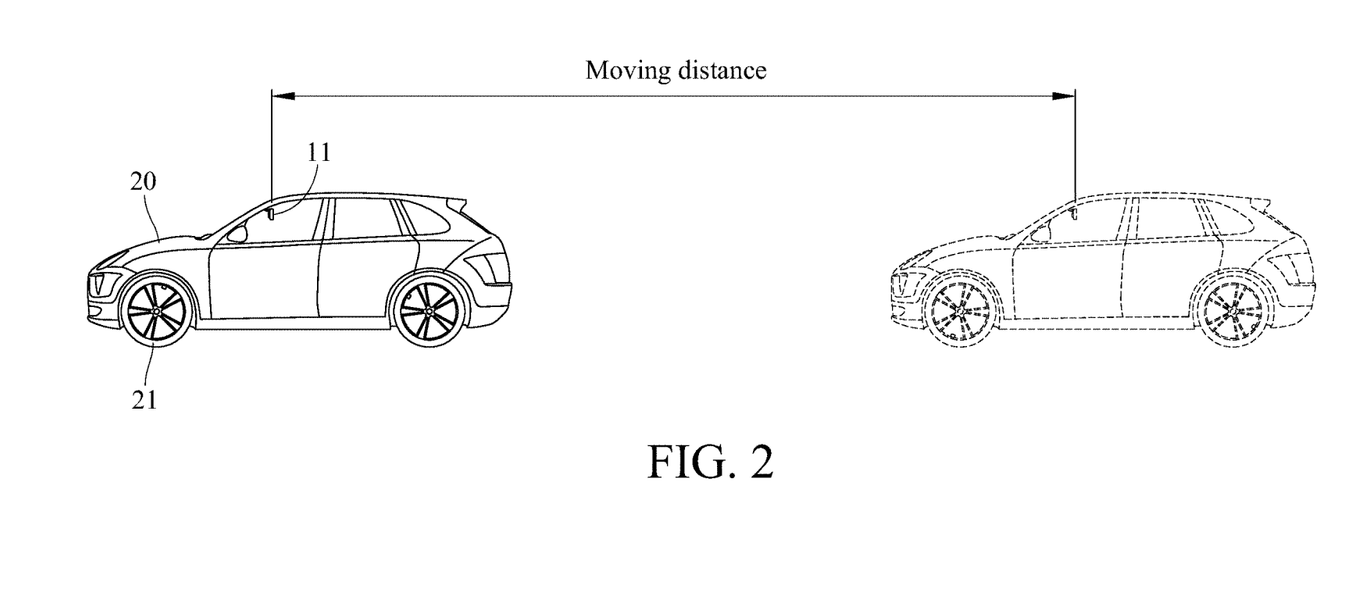
FIG. 2 is a schematic view of a vehicle moving a moving distance in an embodiment of the disclosure.
Figure 3:
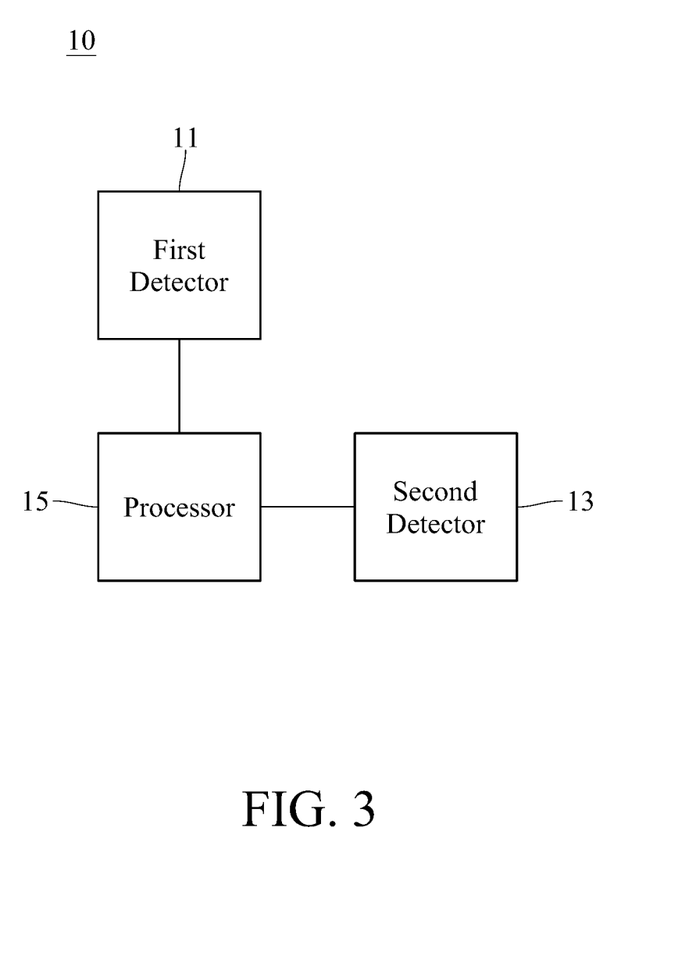
FIG. 3 is a functional block diagram of a system of detecting a wheel tread depth in an embodiment of the disclosure.

Please refer to FIG. 1 to FIG. 3, FIG. 1 is a schematic view of a vehicle with wheels in an embodiment of the disclosure, FIG. 2 is a schematic view of a vehicle moving a moving distance in an embodiment of the disclosure, and FIG. 3 is a functional block diagram of a system of detecting a wheel tread depth in an embodiment of the disclosure. In the figures, a detection system 10 is installed on a vehicle 20. The vehicle 20 includes at least one wheel 21, and the at least one wheel 21 is driven by a driving device to cause the vehicle 20 move. In practice, the vehicle 20 is, for example, a motorcycle, a car, a trailer of a combination vehicle or other suitable objects. The wheel 21 has a wheel rim and a tire, and the tire is fixed on the wheel rim and is filled with gas so that the wheel 21 has a tire pressure.

The detection system 10 includes a first detector 11, a second detector 13 and a processor 15. The first detector 11 is used to detect a moving distance of the vehicle 20. The first detector 11 is, for example, a global positioning system (GPS) that is built in the vehicle 20 or in an event data recorder (EDR) installed in the vehicle 20 or is another device capable of detecting the moving distance of the vehicle 20. For example, the moving distance of the vehicle 20 is calculated by the positioning function of the GPS or is perfected using the map information, and the disclosure is not limited thereto. In an embodiment, the first detector 11 may consider whether the vehicle 20 is activated and/or whether the wheel 21 starts rotating, to decide whether to start the detection of the moving distance of the vehicle 20. In other words, the first detector 11 may not detect the moving distance of the vehicle 20 when the wheel 21 does not rotate but the vehicle 20 is moving. In practice, for example, if the vehicle 20 is being towed away, the wheel 21 of the vehicle 20 does not rotate, so the first detector 11 does not detect the moving distance of the vehicle 20. For a concise description, the first detector 11 is disposed in the vehicle 20 in the figure; and in practice, the first detector may be disposed inside or outside the vehicle 20, on the wheel 21, or other position.

The second detector 13 is used to detect the rotation of the wheel 21 to obtain the number of turns and provide this data to the processor 15. In an embodiment, the second detector 13 detects the number of turns of the wheel 21 when the vehicle 20 is moving a moving distance. In practice, the second detector 13 is, for example, a device built in the vehicle 20 for recording the number of turns of the wheel 21, a G-sensor or other suitable detector. A person having ordinary skill in the art can design the position of the second detector 13, e.g. on the wheel 21, the vehicle 20 or any position, and this embodiment is not limited thereto.

The processor 15 is electrically connected to the first detector 11 and the second detector 13, so as to calculate the current diameter of the wheel 21 according to the moving distance detected and obtained by the first detector 11 and the number of turns detected and obtained by the second detector 13, and then determine the pattern parameter of the wheel 21 according to the current diameter of the wheel 21 and a reference value. For example, when the moving distance of the vehicle 20, detected and obtained by the first detector 11, is 100 km, the second detector 13 may detect and obtain 53859 turns during the 100 km movement of the vehicle 20, so the processor 15 calculates the current diameter of the wheel 21 to be 591 mm (100×106÷53859π=591). The reference value is, for example, the diameter of a new wheel, the diameter of a new wheel minus the double of the wheel tread depth, or another suitable value. The pattern parameter of the wheel 21 is, for example, the current wheel tread depth of the wheel 21, the abrasion variation of tread pattern, or other parameters related to the tread pattern of the wheel 21. Particularly, for example, when the reference value is the diameter of a new wheel, and the processor 15 determines the abrasion variation of the tread pattern of the wheel 21 according to the obtained current diameter and the reference value. For example, when the reference value is the diameter of a new wheel minus the double of the wheel tread depth, the processor 15 determines the current wheel tread depth of the wheel 21 according to the obtained current diameter and the reference value. In the previous examples, the reference value is based on the diameter of a new wheel, but in practice, the diameter of a new wheel may be replaced by the initial diameter of the wheel 21, such as the diameter predefined in the processor 15, the current diameter previously calculated by the processor 15, or other suitable initial values.

For example, the reference value is obtained from a specification database according to the wheel model by the processor 15, or is directly preset in the processor 15. Furthermore, the processor 15 is independently installed on the vehicle 20. Optionally, the processor 15 and at least one of the first detector 11 and the second detector 13 are assembled into a device which will be disposed to either the vehicle 20 or the wheel 21; and for example, the processor 15 and the first detector 11 are assembled into an event data recorder which will be disposed to a suitable position on the vehicle 20, and the embodiment is not limited thereto. A person having ordinary skill in the art can selectively design the processor 15 to be electrically connected to the first detector 11 and the second detector 13 in the wired or wireless way according to a variety of dispositions of the first detector 11, the second detector 13 and the processor 15, and the embodiment is not limited to it.

Figure 4:
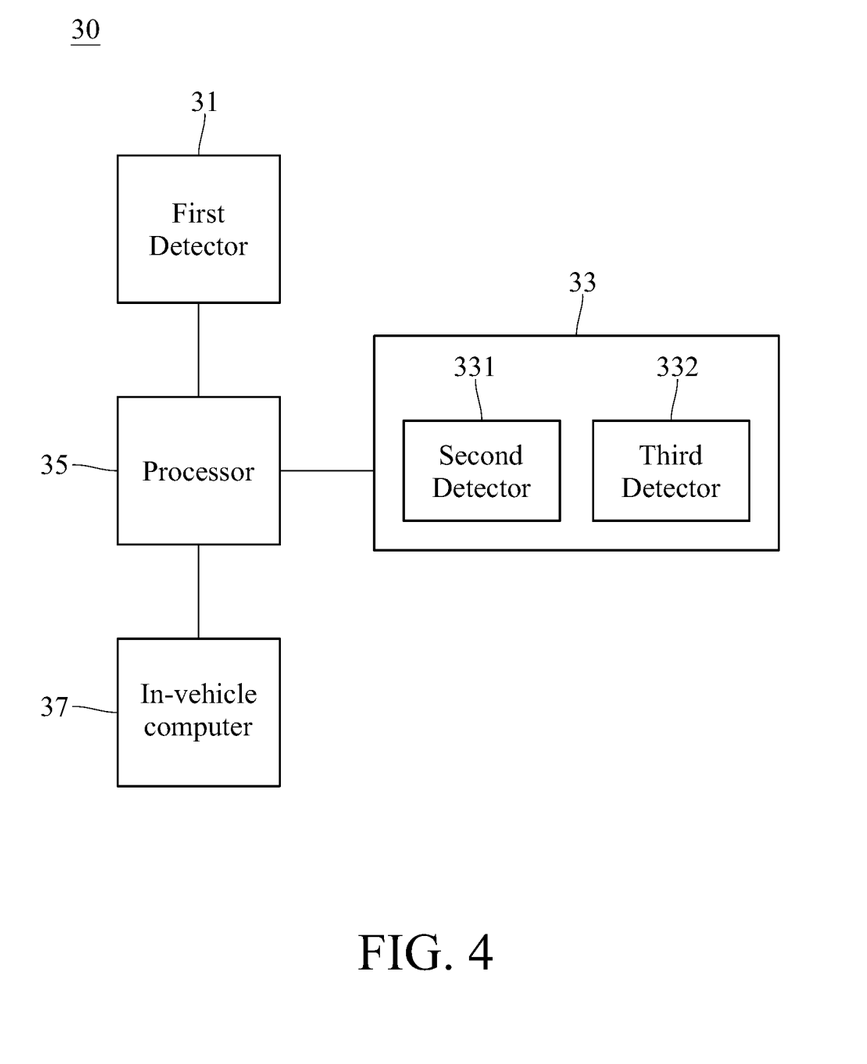
FIG. 4 is a functional block diagram of a system of detecting a wheel tread depth in another embodiment of the disclosure.

Next, please refer to FIG. 1 and FIG. 4. FIG. 4 is a functional block diagram of a system of detecting a wheel tread depth in another embodiment of the disclosure. In the figure, the detection system 30 includes a first detector 31, a monitoring device 33, a processor 35 and an in-vehicle computer 37. The monitoring device 33 includes a second detector 331 and a third detector 332. The first detector 31, the second detector 331 and the processor 35 are substantially the same as the first detector 11, the second detector 13 and the processor 15 in the previous embodiment, and they are not repeatedly described hereinafter.

The in-vehicle computer 37 is, for example, built in or additionally installed in the vehicle 20 and is applicable to read data from various electronic control units (ECUs) in the vehicle 20 and then integrate these readings to calculate the real-time fuel consumption, mean fuel consumption, quantity of remaining fuel, range, engine speed, intake pressure, acceleration performance, temperature of liquid coolant of the vehicle 20 or other measurable information of the vehicle 20. The processor 35 determines a first correction parameter according to a first vehicle event recorded by the in-vehicle computer 37, and determines a second correction parameter according to a second vehicle event recorded by the in-vehicle computer 37.

The first correction parameter is used to correct the moving distance detected by the first detector 31, and the second correction parameter is used to correct the number of turns of the wheel 21 detected by the second detector 331. For example, the first vehicle event is that the wheel 21 is locked as the vehicle 20 is still sliding after the driver slams on the brake. In this case, the number of turns of the wheel 21 detected by the second detector 331 stops increasing since the wheel 21 is locked, but the moving distance detected by the first detector 31 keeps increasing. The first detector 31 records an additional moving distance that the vehicle 20 goes into a slide in the first vehicle event, so the processor 35 decides the first correction parameter in response to the analysis of the first vehicle event read from the in-vehicle computer 37, to correct the moving distance detected by the first detector 31. For example, if the moving distance of the vehicle 20 detected by the first detector 31 is up to 10 km and the in-vehicle computer 37 records that the vehicle 20 additionally goes into a slide of 2 m in the moving distance of 10 km, the processor 35 may decide that the first correction parameter is 0.9998 (i.e. 1−0.002/10=0.9998) according to the first vehicle event, and then correct the moving distance to be 9.998 km (i.e. 10×0.9998=9.998).

The second vehicle event is, for example, that the wheel 21 is spinning with little or no traction as the vehicle 20 does not go forward after the driver slams on the accelerator. In this case, the number of turns of the spinning wheel 21 detected by the second detector 331 is increasing, but the moving distance detected by the first detector 31 does not increase. The second detector 331 records the additional number of turns of the spinning wheel 21 in the second vehicle event, so the processor 35 decides the second correction parameter in response to the analysis of the second vehicle event read from the in-vehicle computer 37, to correct the number of turns detected by the second detector 331. For example, if the moving distance of the vehicle 20 is up to 10 km as the number of turns of the wheel 21 detected by the second detector 331 is 541, and the in-vehicle computer 37 records that two of the 541 turns of the wheel 21 are accidentally produced by the spinning of the wheel 21 with lessened traction, the processor 35 may decide the second correction parameter to be 0.9963 (i.e. 1−2/541=0.9963) according to the second vehicle event, and then correct the number of turns to be 538.9 turns (i.e. 541×0.9963=538.9).

The processor 35 calculates the current diameter of the wheel 21 according to the corrected moving distance and the corrected number of turns. In this embodiment, the in-vehicle computer 37 may directly analyze the additional number of turns of the wheel 21 spinning or analyze the additional distance of the vehicle 20 sliding for the concise description; in another embodiment, the processor 35 reads the relevant parameters from the in-vehicle computer 37 to determine the additional number of turns of the wheel 21 spinning or analyze the additional distance of the vehicle 20 sliding and then correct the moving distance and the number of turns to calculate the current diameter of the wheel 21; and however, this embodiment is not limited to it.

The third detector 332 is, for example, a tire pressure sensor to detect the tire pressure of a wheel 31 and send the tire pressure of the wheel 31 to the processor 35. In an embodiment, the processor 35 determines a third correction parameter according to the tire pressure detected and obtained by the third detector 332, and uses the third correction parameter to correct the current diameter. In practice, the tire pressure affects the aspect ratio of the wheel 21; the higher the tire pressure, the larger the aspect ratio of the wheel 21 is. Also, the relatively large aspect ratio of the wheel 21 leads to the relatively-high height of the wheel and thus, affects how far the vehicle 20 moves as the wheel 21 rotates one turn. Therefore, the processor 35 determines the third correction parameter according to the tire pressure detected by the third detector 332 to correct the current diameter. For a particular operation, the processor 35 stores a relationship table for the tire pressure and the aspect ratio, so that the processor 35 looks up the aspect ratio in the table according to the tire pressure and then determines the third correction parameter according to the aspect ratio; and this embodiment is not limited to it. In practice, the third correction parameter decided according to the tire pressure may be used to correct the moving distance detected by the first detector 31, or to correct the number of turns detected by the second detector 331, so the current diameter of the wheel 21 may be calculated using the corrected moving distance or the corrected number of turns. In other words, the tire pressure of the wheel 21 is not limited to be detected while the current diameter of the wheel 21 is calculated. In an embodiment, the tire pressure of the wheel 21 is not limited to be detected when the vehicle is normally going forward, so the processor 35 decides the third correction parameter according to the tire pressure of the wheel 21 and corrects the moving distance or the number of turns using the third correction parameter, so as to calculate the current diameter of the wheel 21.

In another embodiment, the second detector 331 is directly used to detect the tire pressure of the wheel 21, and optionally, the monitoring device 33 including the second detector 331 and the third detector 332 is used to detect the number of turns and the tire pressure of the wheel 21 and is not limited to be disposed on the wheel 21 or other positions on the vehicle 20.

Moreover, all of the foregoing first, second and third correction parameters may not be necessary; that is, one or more of the first, second or third correction parameters can be selected or added according to actual requirements to perfect the detect result. The above vehicle events used to determine the first and second correction parameters are exemplified for a concise description; and particularly, the first correction parameter and the second correction parameter are associated with the driver's driving behavior, so a person having ordinary skill in the art can, in view of the above description, use other data or events to decide the first correction parameter and the second correction parameter. Likewise, other data or detected data may be used to decide the third correction parameter, and this embodiment is not limited to this.

In another embodiment, the detection system 30 may calculate the current diameter of the wheel 21 many times during a route period to determine the variance of the wheel 21. Specifically, the current diameter of the wheel 21 is calculated once per a predefined distance in a first route period that the vehicle 20 moves, and a variance function of the diameter of the wheel 21 is then determined according to these current diameters obtained during the first route period.

For example, the first route period is a period that the vehicle 20 moves about 100 km, the predefined distance is 10 km, and during this first route period, the processor 15 calculates the current diameter of the wheel 21 once per 10 km and obtains 10 pieces of the current diameter. The processor 15 determines the variance function of the diameter of the wheel 21 according to the variations in the 10 pieces of the current diameter.

Then, the processor 35 uses the variance function and a reference value to decide a pattern parameter of the wheel 21. In this embodiment, the reference value is, for example, the wheel tread depth of a new tire, the wheel tread depth previously calculated, or other reference depth qualified to be a reference value, and the pattern parameter of the wheel 21 is the wheel tread depth of the wheel 21. In practice, the processor 35 may obtain the variances in the wheel tread depth of the wheel 21 related to the first route period according to this variance function and may then calculate the wheel tread depth that the vehicle 20 moves for the first route period, according to the wheel tread depth previously calculated. Similarly, the wheel tread depth obtained when the vehicle 20 moves for the first route period this time may be used as a reference value for the next route period.

In this embodiment, through the variance function obtained during the first route period, the detection system may pre-estimate the variances in the wheel tread depth during a second route period, so as to notify the driver if the wheel should be replaced or not. Particularly, the detection system 30 may be connected to a satellite navigation system, and if the driver sets a second route period through the satellite navigation system, the detection system could, according to the variance function obtained during the first route period, determine whether the wheel tread depth of the wheel, obtained when the vehicle 20 moves for the second route period, is shorter than a predefined depth, so as to warn the driver. For example, the predefined depth is not limited to be the wheel tread depth with a relatively-low opportunity of the occurrence of flat tire, or other suitable values.

In another embodiment, the processor 35 may determine the average of the current diameters of the wheel 21 related to the first route period according to the current diameters obtained during the first route period. In the case of the following equation, $$R_{avg}(n\ ..\ m) = \frac{\sum_{k=n}^{m} \frac{M(c_k)B_{kM}}{C_k \pi B_{kC}} P_k}{m-n},$$

wherein $M(C_k)$ represents, for example, a moving distance obtained by referring to the map information, $B_{km}$ represents, for example, a first correction parameter, $C_k$ represents, for example, the number of turns of the wheel 21, $B_{kc}$ represents, for example, a second correction parameter, and $P_k$ represents, for example, a third correction parameter. If k=n, the processor 15 may obtain the current diameter of the wheel related to the first piece of the 10 km moving distance; if k=n+1, the processor 15 may obtain the current diameter of the wheel related to the second piece of the 10 km moving distance; if k=m, the processor 15 may obtain the current diameter of the wheel related to the tenth piece of the 10 km moving distance; and the others can be deduced by analogy, and Ravg(n . . . m) is the average of the (m-n) pieces of current diameter.

Accordingly, Ravg(1 . . . n) may be understood as the average of the front n pieces of current diameter of a new tire in the beginning of usage, and may be a reference value used to calculate the wheel tread depth by the processor 35 every time; and for example, the following equation is used to calculate the wheel tread depth:

$$d_{(n\ ..\ m)} = d_{first} - \frac{R_{avg}(1\ ..\ n) - R_{avg}(n\ ..\ m)}{2},$$

wherein $d_{first}$ is the wheel tread depth of a new tire.

Figure 5:
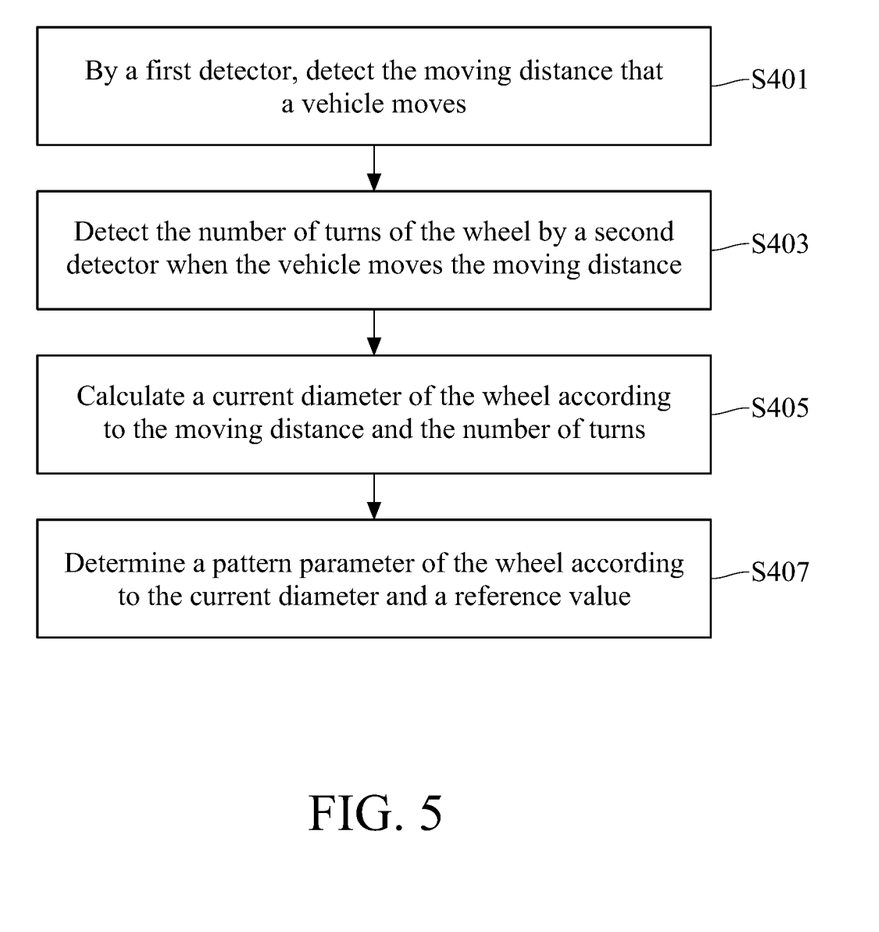
FIG. 5 is a flow chart of a method of detecting a wheel tread depth in an embodiment of the disclosure.

For the clarification of the detection method used in the detection system, please refer to FIGS. 1, 3 and 5, and FIG. 5 is a flow chart of a method of detecting a wheel tread depth in an embodiment of the disclosure. The method includes the following steps. In step S401, the first detector 11 is used to detect the moving distance that the vehicle 20 moves. In step S403, the second detector 13 is used to detect the number of turns that the wheel 21 rotates when the vehicle 20 moves the moving distance. In step S405, the moving distance and the number of turns are used to calculate the current diameter of the wheel 21. In step S407, the current diameter and a reference value are used to determine a pattern parameter of the wheel 21. In the disclosure, the method has been described in the foregoing embodiments and thus, is not repeatedly described hereinafter.

Figure 6:
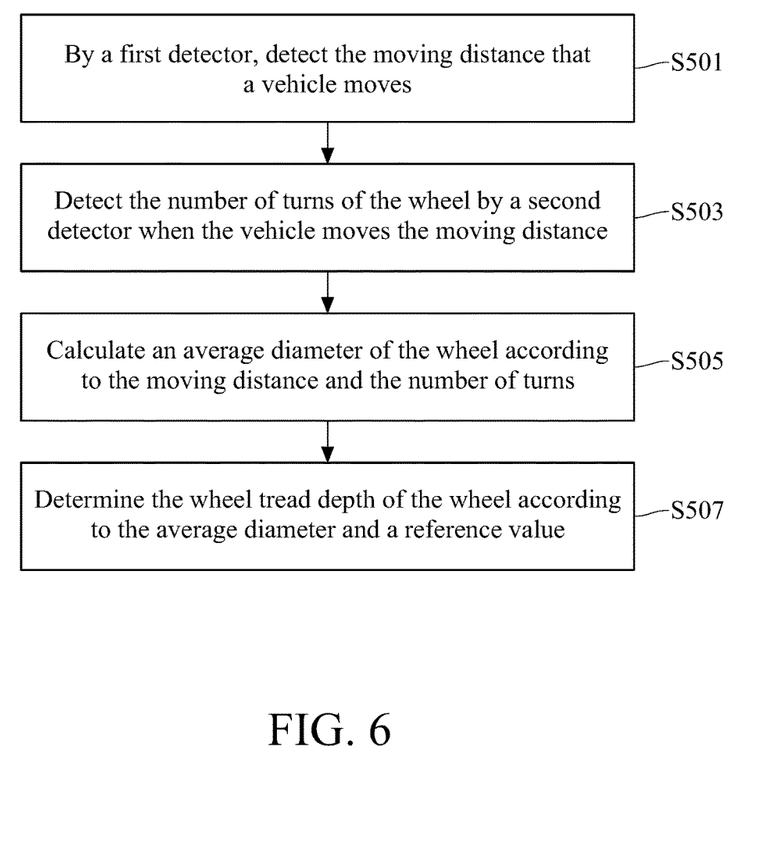
FIG. 6 is a flow chart of the operation of a processor executing a non-transitory computer-readable medium in an embodiment of the disclosure.

Next, please refer to FIG. 6, and FIG. 6 is a flow chart of the operation of a processor executing a non-transitory computer-readable medium in an embodiment of the disclosure. The aforementioned detection method of the wheel tread depth may particularly be carried out on a vehicle's computer system, an in-vehicle computer or other suitable devices. In other words, the detection method of the wheel tread depth may be effectuated when executable instructions made by computer programming languages are executed by a processor in the vehicle's computer after read from a non-transitory computer-readable medium. When the computer's processor executes the executable instructions stored in the non-transitory computer-readable medium for the detection method of the wheel tread depth in the embodiment, the method includes steps as shown in FIG. 5. In step S501, the processor drives a first detector to detect the moving distance of a vehicle. In step S503, the processor drives a second detector to detect the number of turns of a wheel when the vehicle moves the moving distance. In step S505, the moving distance and the number of turns are used to calculate the current diameter of the wheel. In step S507, the current diameter and a reference value are used to determine a pattern parameter of the wheel. A person having ordinary skill in the art should understand in view of the foregoing embodiments that the processor reads the executable content from the non-transitory computer-readable medium in this embodiment, and it will not repeatedly be described hereinafter.

As set forth above, the disclosure, providing a method, system and non-transitory computer-readable medium to detect the wheel tread depth, employs two different detectors to detect the moving distance that a vehicle is moving, and the number of turns that a wheel rotates. Then, the disclosure uses this information to accurately calculate and determine a pattern parameter of the wheel, such as the wheel tread depth or the variation of the wheel tread depth, to reduce the possibility that the wheel's tire is punctured because of the deficient wheel tread depth. In another embodiment, the disclosure further employs map information, an in-vehicle computer, a tire pressure sensor or other available devices to determine various situations occurring to the vehicle that is moving, thereby correcting the moving distance, the number of turns and the current diameter for the more accurate calculation of the wheel tread depth. Moreover, the disclosure may detect the variation of the wheel tread depth to estimate the variation of the wheel tread depth related to the next route period and according to the estimation, warn the driver of replacing the worn tire, so it may reduce the driver missing the right time to replace the worn tire if neglecting to check the wheel tread depth.

What is claimed is:
1. A method of detecting a wheel tread depth, comprising:
   detecting a moving distance that a vehicle moves via at least one wheel, by a first detector;
   detecting a number of turns of the wheel by a second detector in response to the moving distance of the vehicle;
   determining a first correction parameter according to a first vehicle event recorded by an in-vehicle computer, wherein the first vehicle event is that the moving distance of the vehicle is increased while the number of turns detected by the second detector is not increased;
   correcting the moving distance detected by the first detector according to the first correction parameter;
   calculating a current diameter of the wheel once according to the corrected moving distance and the number of turns in response to the corrected moving distance of the vehicle arriving a predefined distance every time in a first route period;
   correcting the number of turns using a second correction parameter, wherein the current diameter of the wheel is calculated according to the corrected moving distance and a corrected number of turns;
   detecting a tire pressure of the wheel by a third detector;
   determining a third correction parameter according to the tire pressure;
   correcting the current diameter of the wheel according to the third correction parameter;
   determining a variance function of the current diameter of the wheel on the first route period according to the current diameters related to the first route period after correcting the current diameter of the wheel;
   determining a current wheel tread depth of the wheel according to the variance function of the current diameter and a wheel tread depth previously calculated;

pre-estimating a next wheel tread depth related to a next route period through the variance function related to the first route period and the current wheel tread depth; and determining whether the next wheel tread depth of the wheel is shorter than a predefined depth of the wheel in response to a movement of the vehicle for the next route period.

2. The method according to claim 1, further comprising:

determining the second correction parameter according to a second vehicle event recorded by the in-vehicle computer;

wherein the second vehicle event is that the number of turns detected by the second detector is increased while the moving distance of the vehicle is not increased.

3. A system of detecting a wheel tread depth, comprising:

a first detector for detecting a moving distance that a vehicle moves via at least one wheel;

a second detector for detecting a number of turns of the wheel of the vehicle in the moving distance; and a processor electrically connected to the first detector and the second detector, wherein the processor determines a first correction parameter according to a first vehicle event recorded by an in-vehicle computer, the first vehicle event is that the moving distance of the vehicle is increased while the number of turns detected by the second detector is not increased, the processor corrects the moving distance according to the first correction parameter, the processor calculates a current diameter of the wheel once according to a corrected moving distance and the number of turns in response to the corrected moving distance of the vehicle arriving a predefined distance every time in a first route period, the processor further corrects the number of turns using a second correction parameter, and calculates the current diameter of the wheel according to the corrected moving distance and a corrected number of turns;

a third detector for detecting a tire pressure of the wheel and electrically connected to the processor;

wherein the processor determines an aspect ratio of the wheel according to the tire pressure, the processor determines a third correction parameter according to the aspect ratio, the processor corrects the current diameter of the wheel according to the third correction parameter, the processor determines a variance function of the current diameter of the wheel related to the first route period according to the current diameters obtained on the first route period after correcting the current diameter of the wheel, the processor determines a current wheel tread depth of the wheel according to the variance function of the current diameter and a wheel tread depth previously calculated, the processor pre-estimates a next wheel tread depth related to a next route period through the variance function related to the first route period and the current wheel tread depth, the processor determines whether the next wheel tread depth of the wheel of the vehicle is shorter than a predefined depth of the wheel in response to a movement of the vehicle for the next route period.

4. The system according to claim 3, further comprising:

the in-vehicle computer for recording a second vehicle event occurring to the vehicle, wherein the second vehicle event is that the number of turns detected by the second detector is increased as the moving distance of the vehicle is not increased, the processor determines the second correction parameter according to the second vehicle event.

5. A non-transitory computer readable medium comprising executable instructions that when executed by a processor cause the processor to effectuate a method comprising:

driving a first detector to detect a moving distance that a vehicle moves via at least one wheel;

driving a second detector to detect a number of turns of the wheel of the vehicle in the moving distance;

determining a first correction parameter according to a first vehicle event recorded by an in-vehicle computer, wherein the first vehicle event is that the moving distance of the vehicle is increased while the number of turns detected by the second detector is not increased;

correcting the moving distance detected by the first detector according to the first correction parameter;

calculating a current diameter of the wheel once according to a corrected moving distance and the number of turns in response to the corrected moving distance of the vehicle arriving a predefined distance every time in a first route period;

correcting the number of turns using a second correction parameter;

calculating the current diameter of the wheel according to the corrected moving distance and a corrected number of turns;

driving a third detector to detect a tire pressure of the wheel;

determining a third correction parameter according to the tire pressure;

correcting the current diameter of the wheel according to the third correction parameter;

determining a variance function of the current diameter of the wheel related to the first route period according to the current diameters obtained on the first route period after correcting the current diameter of the wheel;

determining a current wheel tread depth of the wheel according to the variance function of the current diameter and a wheel tread depth previously calculated;

pre-estimating a next wheel tread depth related to a next route period through the variance function related to the first route period and the current wheel tread depth; and determining whether the next wheel tread depth of the wheel of the vehicle is shorter than a predefined depth of the wheel in response to a movement of the vehicle for the next route period.

6. The non-transitory computer-readable medium according to claim 5, wherein the method further comprises:

reading out a second vehicle event from the in-vehicle computer to determine the second correction parameter;

wherein the second vehicle event is that the number of turns detected by the second detector is increased as the moving distance of the vehicle is not increased.

* * * * *